US011707986B2

(12) United States Patent
Kikuchi et al.

(10) Patent No.: US 11,707,986 B2
(45) Date of Patent: Jul. 25, 2023

(54) VEHICLE, VEHICLE CONTROL SYSTEM, AND VEHICLE CONTROL METHOD

(71) Applicant: TOYOTA JIDOSHA KABUSHIKI KAISHA, Toyota (JP)

(72) Inventors: Yoshiaki Kikuchi, Toyota (JP); Junichi Matsumoto, Toyota (JP); Akio Uotani, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 254 days.

(21) Appl. No.: 17/109,786

(22) Filed: Dec. 2, 2020

(65) Prior Publication Data

US 2021/0188094 A1 Jun. 24, 2021

(30) Foreign Application Priority Data

Dec. 19, 2019 (JP) ................................. 2019-229537

(51) Int. Cl.
*B60L 3/00* (2019.01)
*B60L 50/60* (2019.01)

(52) U.S. Cl.
CPC ............. *B60L 3/0046* (2013.01); *B60L 50/66* (2019.02); *B60L 2240/545* (2013.01)

(58) Field of Classification Search
CPC .. B60L 3/0046; B60L 50/66; B60L 2240/545; B60L 2220/42; B60L 50/16; B60L 2240/54; B60L 58/10; B60L 53/80; B60L 58/12; B60L 58/16; B60L 58/24; Y02T 10/64; Y02T 10/70; Y02T 10/7072

USPC ......................................................... 320/134
See application file for complete search history.

(56) References Cited

U.S. PATENT DOCUMENTS

| | | |
|---|---|---|
| 2004/0027076 A1 | 2/2004 | Shimizu |
| 2007/0075686 A1 | 4/2007 | Togashi et al. |
| 2010/0079111 A1* | 4/2010 | Masuda ................... H02J 7/14 320/152 |
| 2011/0140668 A1 | 6/2011 | Anderson |
| 2020/0361333 A1 | 11/2020 | Satoh |

FOREIGN PATENT DOCUMENTS

| | | |
|---|---|---|
| JP | 2002-186120 A | 6/2002 |
| JP | 2009-214588 A | 9/2009 |
| JP | 4327143 B2 | 9/2009 |
| JP | 2019-140775 A | 8/2019 |
| JP | 2019-156007 A | 9/2019 |

* cited by examiner

*Primary Examiner* — Paul Dinh
(74) *Attorney, Agent, or Firm* — Oliff PLC

(57) ABSTRACT

A vehicle includes: a battery pack including a secondary battery, a battery sensor configured to detect a state of the secondary battery, and a first control device; and a second control device provided separately from the battery pack, wherein: the first control device is configured to set a power upper limit value indicating an upper limit value of a battery power of the secondary battery by using a detection value of the battery sensor; and the second control device is configured to set a guard value of the upper limit value of the battery power by using a temperature of the secondary battery and set the power upper limit value such that the power upper limit value does not exceed the guard value.

6 Claims, 7 Drawing Sheets

VEHICLE, VEHICLE CONTROL SYSTEM, AND VEHICLE CONTROL METHOD

CROSS-REFERENCE TO RELATED APPLICATION

This application claims priority to Japanese Patent Application No. 2019-229537 filed on Dec. 19, 2019, incorporated herein by reference in its entirety.

BACKGROUND

1. Technical Field

The present disclosure relates to a vehicle, a vehicle control system, and a vehicle control method.

2. Description of Related Art

Japanese Unexamined Patent Application Publication No. 2019-156007 (JP 2019-156007 A) discloses a control device that controls input power of a secondary battery mounted on a vehicle by using a power upper limit value (Win) indicating an upper limit value of the input power of the secondary battery.

SUMMARY

Electrically driven vehicles (for example, electric vehicles or hybrid vehicles) that use a secondary battery as a power source have spread in recent years. In the electrically driven vehicles, when the capacity or the performance of the secondary battery decreases due to battery deterioration or the like, it is conceivable that the secondary battery mounted on the electrically driven vehicle is replaced.

The secondary battery is generally mounted on a vehicle in the form of a battery pack. The battery pack includes a secondary battery, a sensor that detects the state of the secondary battery (for example, current, voltage, and temperature), and a control device. Hereinafter, the control device incorporated in the battery pack may be referred to as "battery electronic control unit (ECU)", and the sensor incorporated in the battery pack may be referred to as "battery sensor". Peripheral devices (for example, a sensor and a control device) suitable for the secondary battery are mounted on the battery pack. The battery pack is maintained so that the secondary battery and its peripheral devices can operate normally. Therefore, when replacing the secondary battery mounted on the vehicle, it is considered preferable to replace not only the secondary battery but the entire battery pack mounted on the vehicle from the viewpoint of vehicle maintenance.

As described in JP 2019-156007 A, there is known the control device that is mounted on the vehicle separately from the battery pack and that controls the input power of the secondary battery by using the power upper limit value. The control device is configured to perform power-based input restriction. The power-based input restriction is a process of controlling the input power of the secondary battery so that the input power of the secondary battery does not exceed the power upper limit value. In general, a vehicle that employs a control device that performs the power-based input restriction is equipped with a battery pack including a battery ECU that obtains a power upper limit value using a detection value from a battery sensor.

However, when the entire battery pack is replaced, and, for example, when the battery pack after replacement is an inexpensive battery pack, the output result of the battery ECU after the replacement is not necessarily the same as that of the battery ECU before the replacement due to the difference in calculation accuracy of the battery ECUs before and after the replacement. Therefore, it is required to monitor the suitability of the output result from the battery pack considering the possibility of the replacement of the battery pack and restrain input/output power of the secondary battery from becoming excessive.

The present disclosure provides a vehicle, a vehicle control system, and a vehicle control method that enables monitoring of the suitability of an output result from a battery pack and suppresses the input/output power of a secondary battery from becoming excessive.

A vehicle according to an aspect of the present disclosure includes: a battery pack including a secondary battery, a battery sensor configured to detect a state of the secondary battery, and a first control device; and a second control device provided separately from the battery pack. The first control device is configured to set a power upper limit value indicating an upper limit value of a battery power of the secondary battery by using a detection value of the battery sensor. The second control device is configured to set a guard value of the upper limit value of the battery power by using a temperature of the secondary battery and set the power upper limit value such that the power upper limit value does not exceed the guard value.

A vehicle control system according to a second aspect of the present disclosure is configured such that a battery pack including a secondary battery is mountable on the vehicle control system. The vehicle control system includes: a control unit configured to control battery power of the secondary battery such that the battery power does not exceed a power upper limit value indicating an upper limit value of the battery power of the secondary battery when the battery pack is mounted on the vehicle control system; and a setting unit configured to, when the power upper limit value is input from the battery pack, set a guard value of the upper limit value of the battery power by using a temperature of the secondary battery, and set the power upper limit value such that the power upper limit value does not exceed the guard value.

A vehicle control method according to a third aspect of the present disclosure includes: obtaining, with a vehicle control system on which a battery pack including a secondary battery is mounted, a power upper limit value indicating an upper limit value of a battery power of the secondary battery from the battery pack; setting, with the vehicle control system, a guard value of the upper limit value of the battery power by using a temperature of the secondary battery; and setting, with the vehicle control system, the power upper limit value such that the power upper limit value does not exceed the guard value.

According to the present disclosure, a vehicle, a vehicle control system, and a vehicle control method that enable monitoring of the suitability of an output result from a battery pack and suppress input/output power of a secondary battery from becoming excessive can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
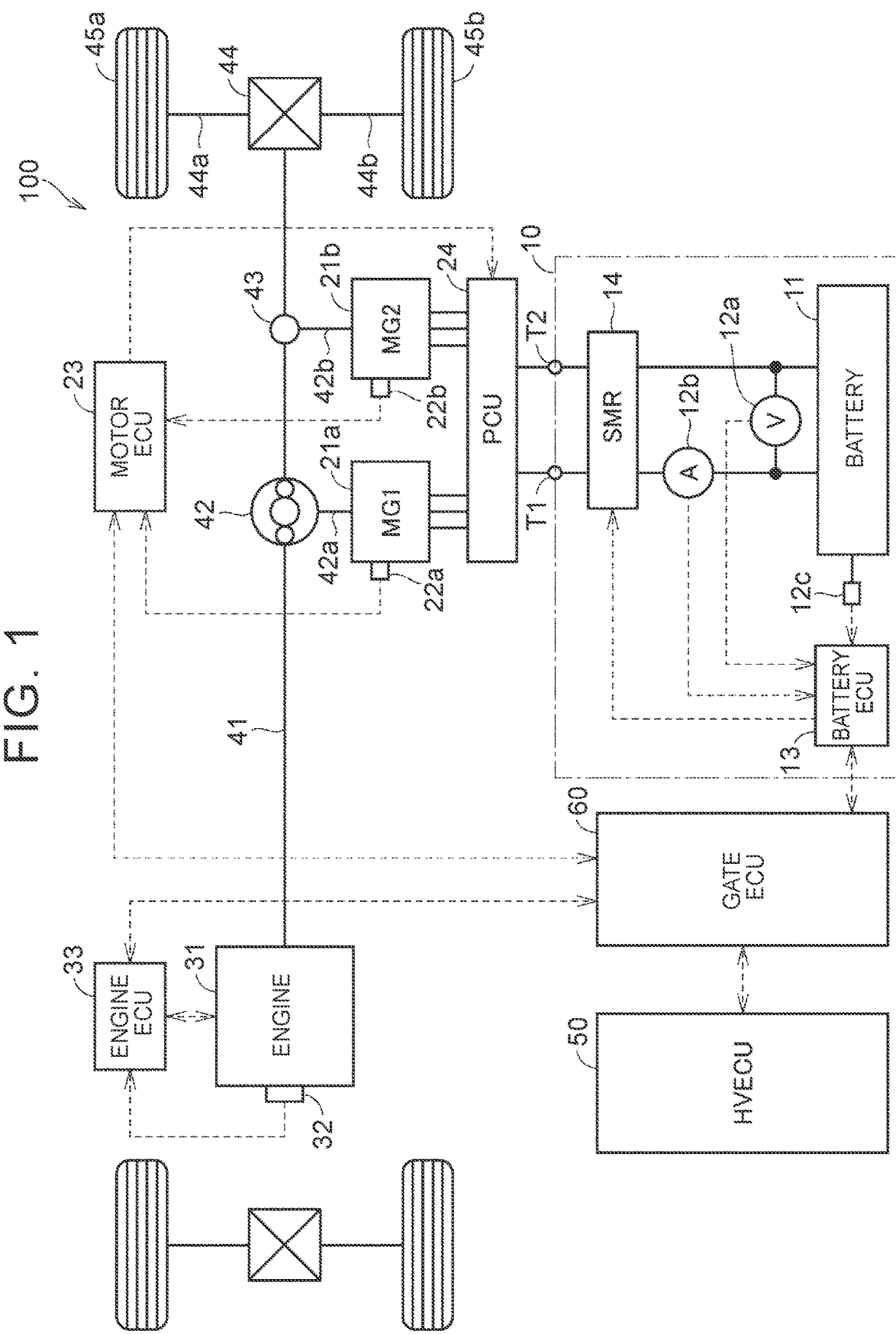
FIG. 1 is a diagram showing a configuration of an electrically driven vehicle according to an embodiment of the present disclosure.

Embodiments of the present disclosure will be described in detail with reference to the drawings. It should be noted that the same or corresponding parts in the drawings are denoted by the same reference characters and repetitive description thereof will be omitted. Hereinafter, an electronic control unit is also referred to as "ECU".

FIG. 1 is a diagram showing a configuration of an electrically driven vehicle (hereinafter referred to as "vehicle") 100 according to an embodiment of the present disclosure. In the present embodiment, the vehicle 100 is assumed to be a front-wheel drive four-wheel vehicle (more specifically, a hybrid vehicle), but the number of wheels and the drive system can be changed as appropriate. For example, the drive system may be rear-wheel drive or four-wheel drive.

Referring to FIG. 1, the vehicle 100 is equipped with a battery pack 10 including a battery ECU 13. Further, a motor ECU 23, an engine ECU 33, an HV ECU 50, and a gateway ECU 60 are mounted on the vehicle 100 separately from the battery pack 10. The motor ECU 23, the engine ECU 33, the HV ECU 50, and the gateway ECU 60 are located outside the battery pack 10. The battery ECU 13 is located inside the battery pack 10. In the present embodiment, the battery ECU 13, the gateway ECU 60, and the HV ECU 50 correspond to examples of a "first control device", a "second control device", and a "third control device" according to the present disclosure, respectively.

The battery pack 10 includes a battery 11, a voltage sensor 12a, a current sensor 12b, a temperature sensor 12c, the battery ECU 13, and a system main relay (SMR) 14. The battery 11 functions as a secondary battery. In the present embodiment, an assembled battery including a plurality of electrically connected lithium ion batteries is adopted as the battery 11. Each secondary battery that constitutes the assembled battery is also referred to as a "cell". In the present embodiment, each lithium-ion battery that constitutes the battery 11 corresponds to the "cell". The secondary battery included in the battery pack 10 is not limited to the lithium ion battery and may be another secondary battery (for example, a nickel metal hydride battery). An electrolytic solution secondary battery or an all-solid-state secondary battery may be used as the secondary battery.

The voltage sensor 12a detects the voltage of each cell of the battery 11. The current sensor 12b detects current flowing through the battery 11 (the charging side takes a negative value). The temperature sensor 12c detects the temperature of each cell of the battery 11. The sensors output the detection results to the battery ECU 13. The current sensor 12b is provided in the current path of the battery 11. In the present embodiment, one voltage sensor 12a and one temperature sensor 12c are provided for each cell. However, the present disclosure is not limited to this, and one voltage sensor 12a and one temperature sensor 12c may be provided for each set of multiple cells, or only one voltage sensor 12a and one temperature sensor 12c may be provided for one assembled battery. Hereinafter, the voltage sensor 12a, the current sensor 12b, and the temperature sensor 12c are collectively referred to as "battery sensor 12". The battery sensor 12 may be a battery management system (BMS) that has a state of charge (SOC) estimation function, a state of health (SOH) estimation function, a cell voltage equalization function, a diagnostic function, and a communication function in addition to the above sensor functions.

The SMR 14 is configured to switch connection and disconnection of power paths connecting external connection terminals T1 and T2 of the battery pack 10 and the battery 11. For example, an electromagnetic mechanical relay can be used as the SMR 14. In the present embodiment, a power control unit (PCU) 24 is connected to the external connection terminals T1 and T2 of the battery pack 10. The battery 11 is connected to the PCU 24 via the SMR 14. When the SMR 14 is in the closed state (connected state), power can be transmitted between the battery 11 and the PCU 24. In contrast, when the SMR 14 is in the open state (disconnected state), the power paths connecting the battery 11 and the PCU 24 are disconnected. In the present embodiment, the SMR 14 is controlled by the battery ECU 13. The battery ECU 13 controls the SMR 14 according to an instruction from the HV ECU 50. The SMR 14 is in the closed state (connected state) when vehicle 100 is traveling, for example.

The vehicle 100 includes an engine 31, a first motor generator 21a (hereinafter referred to as "MG 21a"), and a second motor generator 21b (hereinafter referred to as "MG 21b") as power sources for traveling. The MG 21a and the MG 21b are motor generators that have both a function as a motor that outputs torque by receiving drive power and a function as a generator that generates electric power by receiving the torque. An alternating current (AC) motor (for example, a permanent magnet synchronous motor or an induction motor) is used as the MG 21a and the MG 21b. The MG 21a and the MG 21b are electrically connected to the battery 11 via the PCU 24. The MG 21a has a rotor shaft 42a and the MG 21b has a rotor shaft 42b. The rotor shaft 42a corresponds to a rotation shaft of the MG 21a, and the rotor shaft 42b corresponds to a rotation shaft of the MG 21b.

The vehicle 100 further includes a single-pinion planetary gear 42. An output shaft 41 of the engine 31 and the rotor shaft 42a of the MG 21a are connected to the planetary gear 42. The engine 31 is, for example, a spark-ignition internal combustion engine including a plurality of cylinders (for example, four cylinders). The engine 31 combusts fuel in each cylinder to generate drive force, and the generated drive force rotates a crankshaft (not shown) shared by all the cylinders. The crankshaft of the engine 31 is connected to the output shaft 41 via a torsional damper (not shown). The output shaft 41 rotates along with rotation of the crankshaft.

The planetary gear 42 has three rotating elements, namely, an input element, an output element, and a reaction force element. More specifically, the planetary gear 42 includes a sun gear, a ring gear that is arranged coaxially with the sun gear, a pinion gear that meshes with the sun gear and the ring gear, and a carrier that holds the pinion gear so that the pinion gear can rotate and revolve. The carrier corresponds to the input element, the ring gear corresponds to the output element, and the sun gear corresponds to the reaction force element.

The engine 31 and the MG 21a are mechanically connected to drive wheels 45a and 45b via the planetary gear 42. The output shaft 41 of the engine 31 is connected to the carrier of the planetary gear 42. The rotor shaft 42a of the MG 21a is connected to the sun gear of the planetary gear 42. The torque output from the engine 31 is input to the carrier. The planetary gear 42 is configured to divide the torque output from the engine 31 to the output shaft 41 into torque that is transmitted to the sun gear (eventually the MG 21a) and torque that is transmitted to the ring gear. When the torque output from engine 31 is output to the ring gear, reaction torque generated by the MG 21a acts on the sun gear.

The planetary gear 42 and the MG 21b are configured such that the drive force output from the planetary gear 42 and the drive force output from the MG 21b are combined and transmitted to the drive wheels 45a and 45b. More specifically, an output gear (not shown) that meshes with a driven gear 43 is attached to the ring gear of the planetary gear 42. A drive gear (not shown) attached to the rotor shaft 42b of the MG 21b also meshes with the driven gear 43. The driven gear 43 combines the torque output from the MG 21b to the rotor shaft 42b and the torque output from the ring gear of the planetary gear 42. The drive torque thus combined is transmitted to a differential gear 44 and further transmitted to the drive wheels 45a and 45b via drive shafts 44a and 44b extending from the differential gear 44 to the right and left.

The MG 21a is provided with a motor sensor 22a that detects the state (for example, current, voltage, temperature, and rotation speed) of the MG 21a. The MG 21b is provided with a motor sensor 22b that detects the state (for example, current, voltage, temperature, and rotation speed) of the MG 21b. The motor sensors 22a and 22b output their detection results to the motor ECU 23. The engine 31 is provided with an engine sensor 32 that detects the state of the engine 31 (for example, intake air amount, intake pressure, intake temperature, exhaust pressure, exhaust temperature, catalyst temperature, engine coolant temperature, and engine speed). The engine sensor 32 outputs its detection result to the engine ECU 33.

The HV ECU 50 is configured to output a command (control command) for controlling the engine 31 to the engine ECU 33. The engine ECU 33 is configured to control various actuators of the engine 31 (for example, a throttle valve, an ignition device, and an injector (not shown)) in accordance with the command from the HV ECU 50. The HV ECU 50 can perform engine control through the engine ECU 33.

The HV ECU 50 is configured to output a command (control command) for controlling each of the MG 21a and the MG 21b to the motor ECU 23. The motor ECU 23 is configured to generate current signals (for example, signals indicating the magnitude and the frequency of the current) that match the target torque of each of the MG 21a and the MG 21b in accordance with the command from the HV ECU 50, and output the generated current signals to the PCU 24. The HV ECU 50 can perform motor control through the motor ECU 23.

The PCU 24 includes, for example, two inverters each corresponding to the MG 21a and the MG 21b, and a converter arranged between each inverter and the battery 11. The PCU 24 is configured to supply power accumulated in the battery 11 to each of the MG 21a and the MG 21b, and supply electric power generated by each of the MG 21a and the MG 21b to the battery 11. The PCU 24 is configured such that the states of the MG 21a and the MG 21b can be controlled separately, and, for example, the MG 21b can be in the power running state while the MG 21a is in the regenerative state (that is, the power generation state). The PCU 24 is configured to be able to supply the electric power generated by one of the MG 21a and the MG 21b to the other. The MG 21a and the MG 21b are configured to be able to transmit and receive power to and from each other.

The vehicle 100 is configured to perform hybrid vehicle (HV) traveling and electric vehicle (EV) traveling. The HV traveling is traveling performed by operating the engine 31 and the MG 21b with the engine 31 generating driving force for travel. The EV traveling is traveling performed by operating the MG 21b with the engine 31 stopped. When the engine 31 is stopped, combustion is not performed in the cylinders. When the combustion in the cylinders is stopped, the engine 31 does not generate combustion energy (the driving force for travel). The HV ECU 50 is configured to switch between the EV traveling and the HV traveling depending on the situation.

Figure 2:
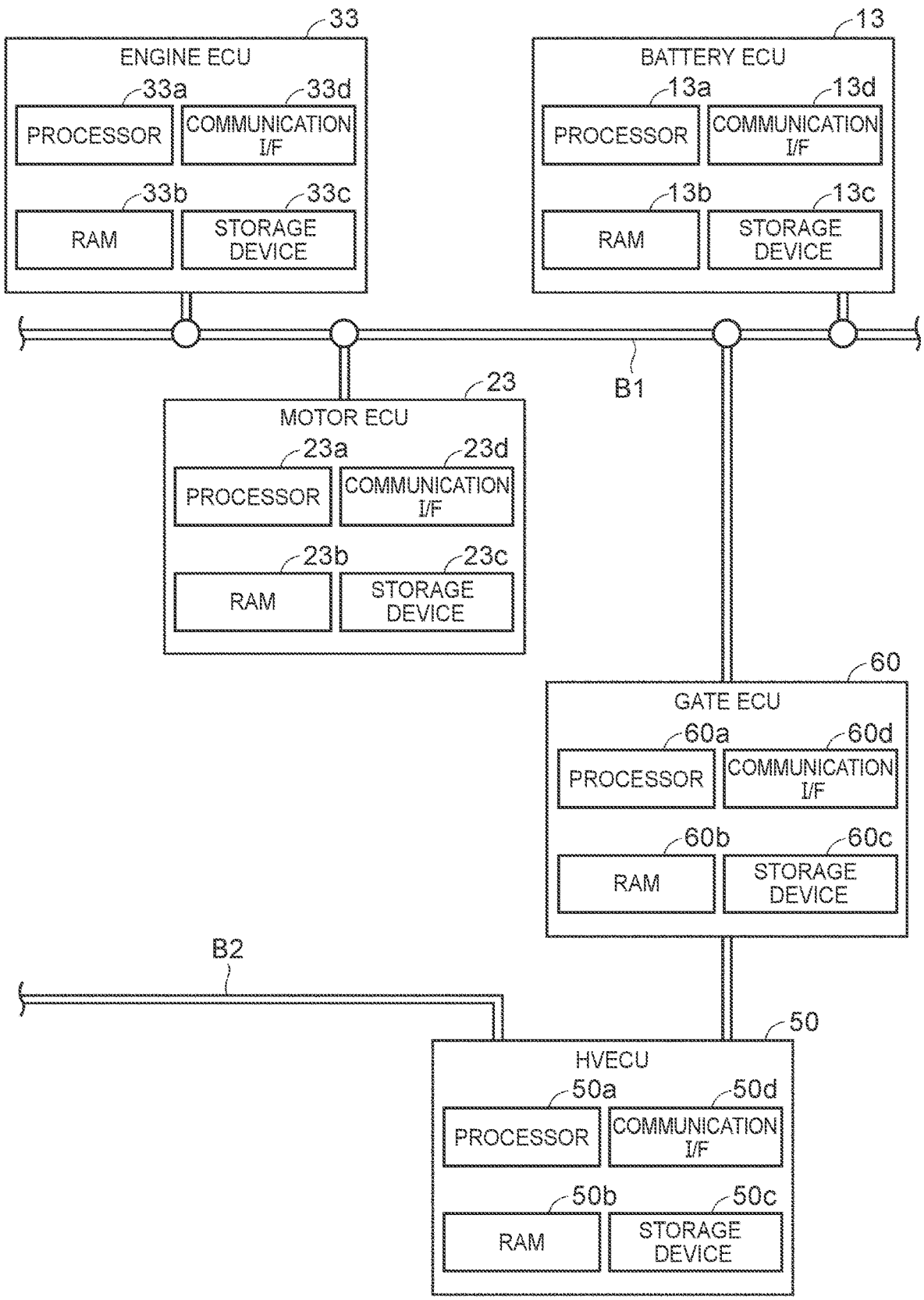
FIG. 2 is a diagram showing a connection mode of each control device included in the vehicle according to the embodiment of the present disclosure.

FIG. 2 is a diagram showing a connection mode of each control device included in the vehicle 100 according to the embodiment of the present disclosure. Referring to FIG. 2, the vehicle 100 includes a local bus B1 and a global bus B2. The local bus B1 and the global bus B2 are, for example, controller area network (CAN) buses.

The battery ECU 13, the motor ECU 23, and the engine ECU 33 are connected to the local bus B1. Although not shown, for example, a human machine interface (HMI) control device is connected to the global bus B2. Examples of the HMI control device include a control device that controls a navigation system or a meter panel. The global bus B2 is connected to another global bus via a central gateway (CGW) not shown.

The HV ECU 50 is connected to the global bus B2. The HV ECU 50 is configured to perform CAN communication with each control device connected to the global bus B2. The HV ECU 50 is connected to the local bus B1 via the gateway ECU 60. The gateway ECU 60 is configured to relay communication between the HV ECU 50 and each control device (for example, the battery ECU 13, the motor ECU 23, and the engine ECU 33) that is connected to the local bus B1. The HV ECU 50 is configured to mutually perform CAN communication with each control device connected to the local bus B1 via the gateway ECU 60. As described above, in the present embodiment, a vehicle control system is constituted by the control devices connected to the local bus B1.

In the present embodiment, a microcomputer is used as the battery ECU 13, the motor ECU 23, the engine ECU 33, the HV ECU 50, and the gateway ECU 60. The battery ECU 13 includes a processor 13a, a random access memory (RAM) 13b, a storage device 13c, and a communication interface (I/F) 13d. The motor ECU 23 includes a processor 23a, a RAM 23b, a storage device 23c, and a communication I/F 23d. The engine ECU 33 includes a processor 33a, a RAM 33b, a storage device 33c, and a communication I/F 33d. The HV ECU 50 includes a processor 50a, a RAM 50b, a storage device 50c, and a communication I/F 50d. The gateway ECU 60 includes a processor 60a, a RAM 60b, a storage device 60c, and a communication I/F 60d. A central processing unit (CPU), for example, can be used as the processors. Each communication I/F includes a CAN controller. Each RAM functions as a working memory that temporarily stores data processed by the processor. Each storage device is configured to be able to save stored information. Each storage device includes, for example, a read-only memory (ROM) and a rewritable nonvolatile memory. Each storage device stores, in addition to a program, information that is used in the program (for example, a map, a mathematical expression, and various parameters). Various controls of the vehicle are executed when the processors execute the programs stored in the storage devices. However, the present disclosure is not limited to this, and various controls may be executed by dedicated hardware (electronic circuit). The number of processors included in each ECU is not limited, and any ECU may include a plurality of processors.

Charge/discharge control of the battery 11 will be described referring to FIG. 1 again. Hereinafter, the input power of the battery 11 and the output power of the battery 11 are collectively referred to as "battery power". The HV ECU 50 determines target battery power using the SOC of the battery 11. Then, the HV ECU 50 controls charge/discharge of the battery 11 so that the battery power becomes closer to the target battery power. However, such charge/discharge control of the battery 11 is restricted by input/output restriction described later. Hereinafter, the target battery power on the charging side (input side) may be referred to as "target input power", and the target battery power on the discharging side (output side) may be referred to as "target output power". In the present embodiment, the power on the discharging side is represented by a positive (+) value and the power on the charging side is represented by a negative (−) value. However, when comparing the magnitude of the power, the absolute value is used regardless of the positive or negative sign (+/−). That is, the magnitude of the power is smaller as the value becomes closer to zero. When an upper limit value and a lower limit value are set for the power, the upper limit value is located on the side where the absolute value of the power is large, and the lower limit value is located on the side where the absolute value of the power is small. The power exceeding the upper limit value on the positive side means that the power becomes larger on the positive side than the upper limit value (that is, the power moves away to the positive side with respect to zero). The power exceeding the upper limit value on the negative side means that the power becomes larger on the negative side than the upper limit value (that is, the power moves away to the negative side with respect to zero). The SOC indicates the remaining charge amount and, for example, the ratio of the current charge amount to the charge amount in the fully charged state is represented by a range between 0% and 100%. As the measuring method of the SOC, a known method such as a current integration method or an open circuit voltage (OCV) estimation method can be adopted.

Figure 3:
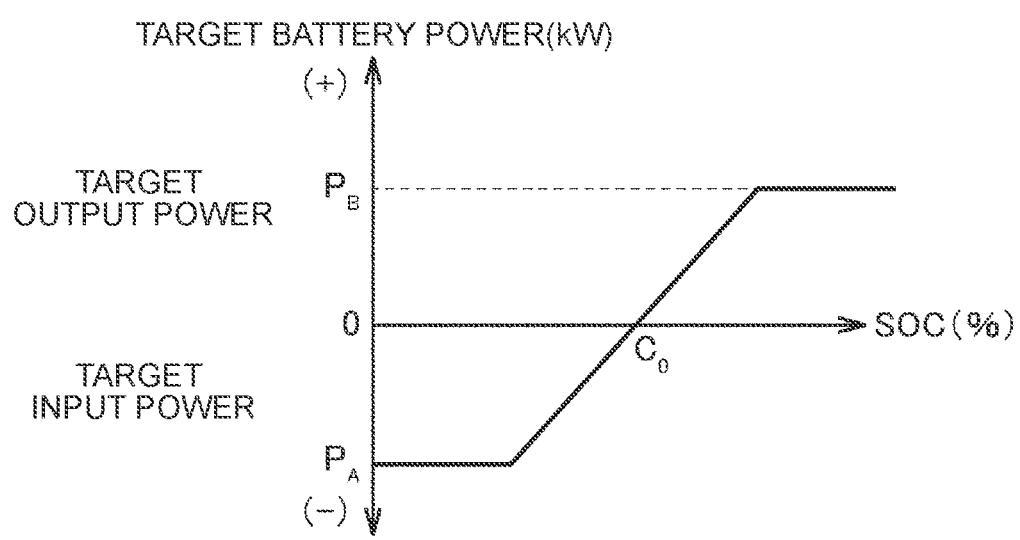
FIG. 3 is a diagram showing an example of a map used for determining target battery power.

FIG. 3 is a diagram showing an example of a map used for determining the target battery power. In FIG. 3, a reference value $C_0$ indicates a control center value of the SOC, a power value $P_A$ indicates the upper limit value of the target input power, and a power value $P_B$ indicates the upper limit value of the target output power. Referring to FIG. 3 together with FIG. 1, according to this map, when the SOC of the battery 11 is the reference value $C_0$, the target battery power is "0", and the battery 11 is neither charged nor discharged. In the region where the SOC of the battery 11 is smaller than the reference value $C_0$ (excessive discharge region), the target input power is larger as the SOC of the battery 11 is smaller until the target input power reaches the upper limit value (power value $P_A$). In contrast, in a region where the SOC of the battery 11 is larger than the reference value $C_0$ (overcharge region), the target output power is larger as the SOC of the battery 11 is larger until the target output power reaches the upper limit value (power value $P_B$). The HV ECU 50 determines the target battery power in accordance with the map shown in FIG. 3, and charges and discharges the battery 11 so that the battery power becomes closer to the determined target battery power, thereby bringing the SOC of the battery 11 closer to the reference value $C_0$. The reference value $C_0$ of the SOC may be a fixed value or may be variable depending on the situation of the vehicle 100.

The HV ECU 50 is configured to perform input restriction and output restriction of the battery 11 using the battery ECU 13 and the gateway ECU 60.

The battery ECU 13 is configured to use the detection value of the battery sensor 12 to obtain an upper limit value PWin of the input power of the battery 11 as a provisional value. The battery ECU 13 is also configured to use the detection value of the battery sensor 12 to obtain an upper limit value PWout of the output power of the battery 11 as a provisional value.

The gateway ECU 60 is interposed between the battery pack 10 and the HV ECU 50, and uses the upper limit value PWin and the upper limit value PWout that are output from the battery pack 10 to set a final upper limit value Win of the input power and a final upper limit value Wout of the output power. Thereby, the final upper limit value Win and the final upper limit value Wout are input to the HV ECU 50.

The HV ECU 50 uses the final upper limit value Win and the final upper limit value Wout that are input from the gateway ECU 60 to control the battery power. That is, the HV ECU 50 controls the engine 31 and the PCU 24 to adjust the battery power so that the battery power does not exceed the final upper limit value Win and the final upper limit value Wout. Therefore, for example, when the final upper limit value Win or the final upper limit value Wout is smaller (that is, closer to zero) than the target battery power, the battery power is controlled to the final upper limit value Win or the final upper limit value Wout instead of the target battery power. In this way, the HV ECU 50 can appropriately perform power-based input restriction and power-based output restriction on the battery 11 included in the battery pack 10.

In the vehicle 100 having the above-described configuration, it is conceivable to replace the battery 11 mounted on the vehicle 100 when the capacity or performance of the battery 11 decreases due to battery deterioration or the like.

The battery 11 is generally mounted on vehicle 100 in the form of the battery pack 10 as described above. Peripheral devices (for example, the battery sensor 12 and the battery ECU 13) suitable for the battery 11 are mounted on the battery pack 10 as described above. The battery pack 10 is maintained so that the battery 11 and its peripheral devices can operate normally. Therefore, when replacing the battery 11 mounted on the vehicle 100, it is considered preferable to replace not only the battery 11 but the entire battery pack 10 mounted on the vehicle 100 from the viewpoint of vehicle maintenance.

However, when the entire battery pack is replaced, and, for example, when the battery pack after replacement is an inexpensive battery pack, the output result of the battery ECU after the replacement is not necessarily the same as that of the battery ECU before the replacement due to the difference in calculation accuracy of the battery ECUs before and after the replacement. Therefore, it is required to monitor the suitability of the output result from the battery pack 10 (specifically, the battery ECU 13) considering the possibility of the replacement of the battery pack 10 and restrain the input/output power of the battery 11 from becoming excessive.

Therefore, in the present embodiment, the battery ECU 13 and the gateway ECU 60 operate as follows. That is, the battery ECU 13 uses the detection value of the battery sensor 12 to set the power upper limit values PWin and PWout, which indicate the upper limit values of the battery power of the battery 11. The gateway ECU 60 uses the temperature of the battery 11 to set guard values GWin and GWout of the upper limit values of the battery power and to set the power upper limit values Win and Wout so that the power upper limit values Win and Wout do not exceed the guard values.

In this way, when the battery ECU 13 sets the power upper limit values PWin and PWout to excessively large values for some reason, the input/output power of the battery 11 can be protected by the guard values GWin and GWout that are set by the gateway ECU 60.

Hereinafter, detailed configurations of the battery ECU 13, the HV ECU 50, and the gateway ECU 60 in the present embodiment will be described.

Figure 4:
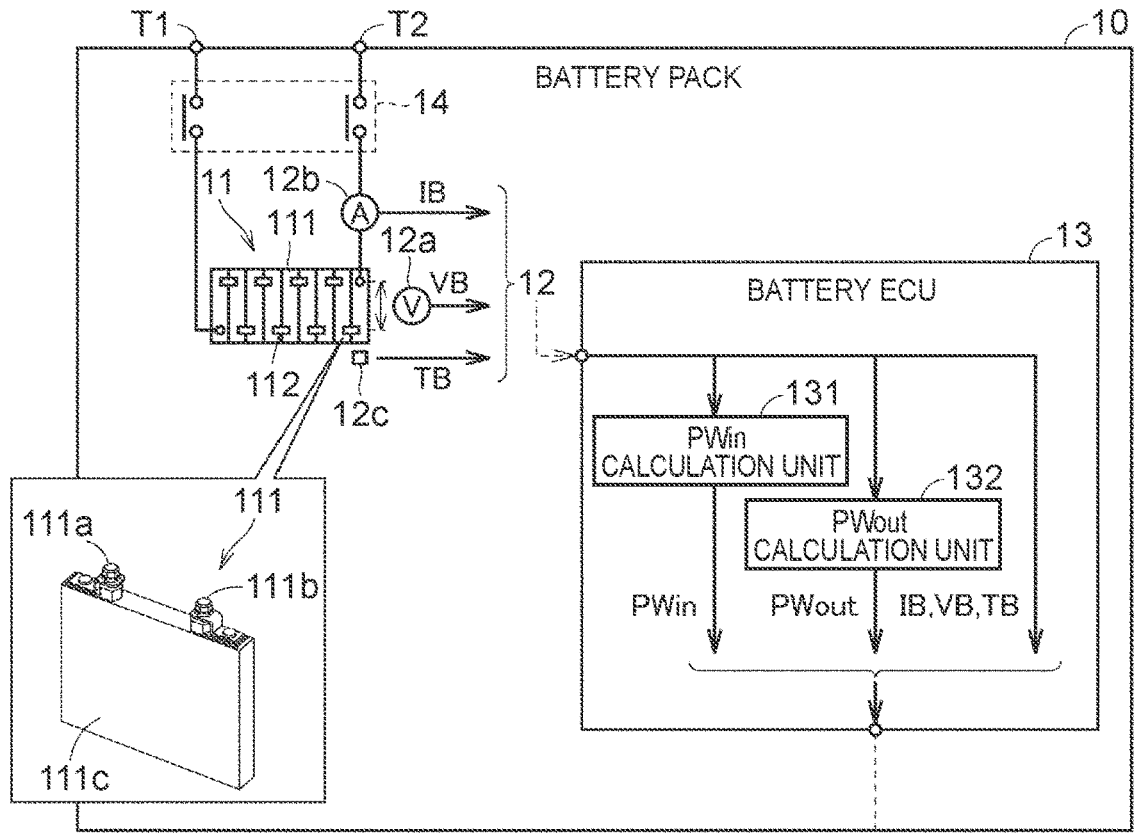
FIG. 4 is a diagram showing a detailed configuration of a battery pack, a hybrid vehicle (HV) electronic control unit (ECU), and a gateway ECU.
Figure 4:
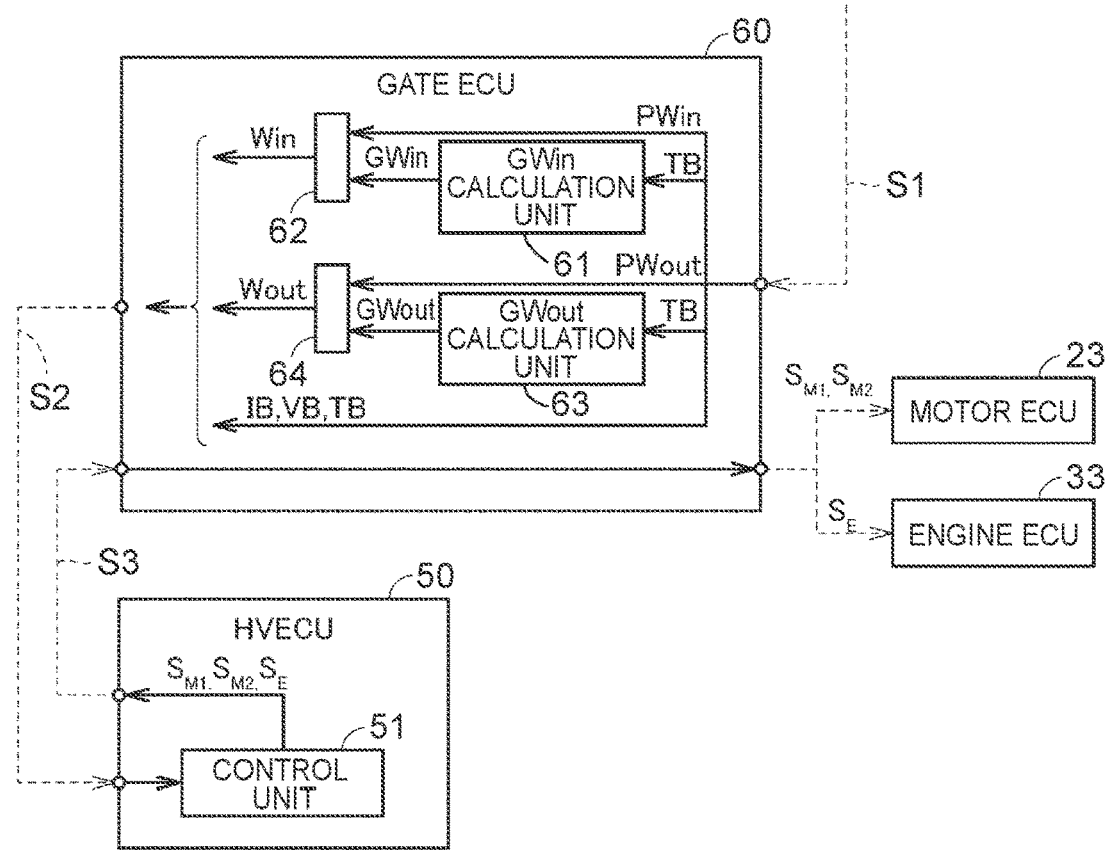

FIG. 4 is a diagram showing a detailed configuration of the battery pack 10, the HV ECU 50, and the gateway ECU 60. Referring to FIG. 4 together with FIG. 2, in the present embodiment, the battery 11 included in the battery pack 10 is an assembled battery including a plurality of cells 111. Each cell 111 is, for example, a lithium ion battery. Each cell 111 includes a positive electrode terminal 111a, a negative electrode terminal 111b, and a battery case 111c. In the battery 11, the positive electrode terminal 111a of one cell 111 and the negative electrode terminal 111b of another cell 111 adjacent to the one cell 111 are electrically connected to each other by a bus bar 112 having conductivity. The cells 111 are connected to each other in series.

The battery pack 10 includes the battery sensor 12, the battery ECU 13, and the SMR 14 in addition to the battery 11. Signals output from the battery sensor 12 to the battery ECU 13 (hereinafter also referred to as "battery sensor signals") include a signal indicating voltage VB output from the voltage sensor 12a and a signal indicating current IB output from the current sensor 12b, and a signal indicating temperature TB output from the temperature sensor 12c. The voltage VB indicates a measured value of the voltage of each cell 111. The current IB indicates a measured value of the current flowing through the battery 11 (the charging side takes a negative value). The temperature TB indicates a measured value of the temperature of each cell 111.

The battery ECU 13 repeatedly obtains the latest battery sensor signals. The interval at which the battery ECU 13 obtains the battery sensor signals (hereinafter also referred to as "sampling cycle") may be a fixed value or may be variable. In the present embodiment, the sampling cycle is 8 ms. However, the present disclosure is not limited to this, and the sampling cycle may be variable within a predetermined range (for example, a range between 1 msec to 1 sec).

The battery ECU 13 includes a PWin calculation unit 131 and a PWout calculation unit 132. The PWin calculation unit 131 is configured to use the detection value of the battery sensor 12 (that is, the battery sensor signals) to obtain the upper limit value PWin. A known method can be used as the calculation method of the upper limit value PWin. The PWin calculation unit 131 may determine the upper limit value PWin so that the charge power restriction is performed to protect the battery 11. The upper limit value PWin may be determined to suppress overcharge, Li deposition, high rate deterioration, and battery overheating in the battery 11, for example. The PWout calculation unit 132 is configured to use the detection value of the battery sensor 12 (that is, the battery sensor signals) to obtain the upper limit value PWout. A known method can be used as the calculation method of the upper limit value PWout. The PWout calculation unit 132 may determine the upper limit value PWout so that the discharge power restriction is performed to protect the battery 11. The upper limit value PWout may be determined to suppress overdischarge, Li deposition, high rate deterioration, and battery overheating in the battery 11, for example. In the battery ECU 13, for example, the PWin calculation unit 131 and the PWout calculation unit 132 are implemented by the processor 13a shown in FIG. 2 and the program executed by the processor 13a. However, the present disclosure is not limited to this, and the PWin calculation unit 131 and the PWout calculation unit 132 may be implemented by dedicated hardware (electronic circuit).

The battery pack 10 outputs the upper limit value PWin calculated by the PWin calculation unit 131, the upper limit value PWout calculated by the PWout calculation unit 132, and the signals input from the battery sensor 12 (that is, the battery sensor signals) as a command signal S1 to the gateway ECU 60. These pieces of information are output from the battery ECU 13 included in the battery pack 10 to the gateway ECU 60 provided outside the battery pack 10. As shown in FIG. 2, the battery ECU 13 and the gateway ECU 60 exchange information through CAN communication.

The gateway ECU 60 includes a GWin calculation unit 61, a Win setting unit 62, a GWout calculation unit 63, and a Wout setting unit 64, which will be described below. In the gateway ECU 60, for example, the GWin calculation unit 61, the Win setting unit 62, the GWout calculation unit 63, and the Wout setting unit 64 are implemented by the processor 60a shown in FIG. 2 and the program executed by the processor 60a. However, the present disclosure is not limited to this, and the PWin calculation unit 131 and the PWout calculation unit 132 may be implemented by dedicated hardware (electronic circuit).

The GWin calculation unit 61 is configured to use the detection value of the battery sensor 12 separately from the battery ECU 13 to obtain the guard value GWin of the upper limit value of the input power. In the present embodiment, the GWin calculation unit 61 determines the guard value GWin using the temperature TB, for example. The GWin calculation unit 61 determines the guard value GWin using, for example, the temperature TB and a map or a mathematical expression, etc. showing a predetermined relationship between the temperature TB and the guard value GWin.

Figure 5:
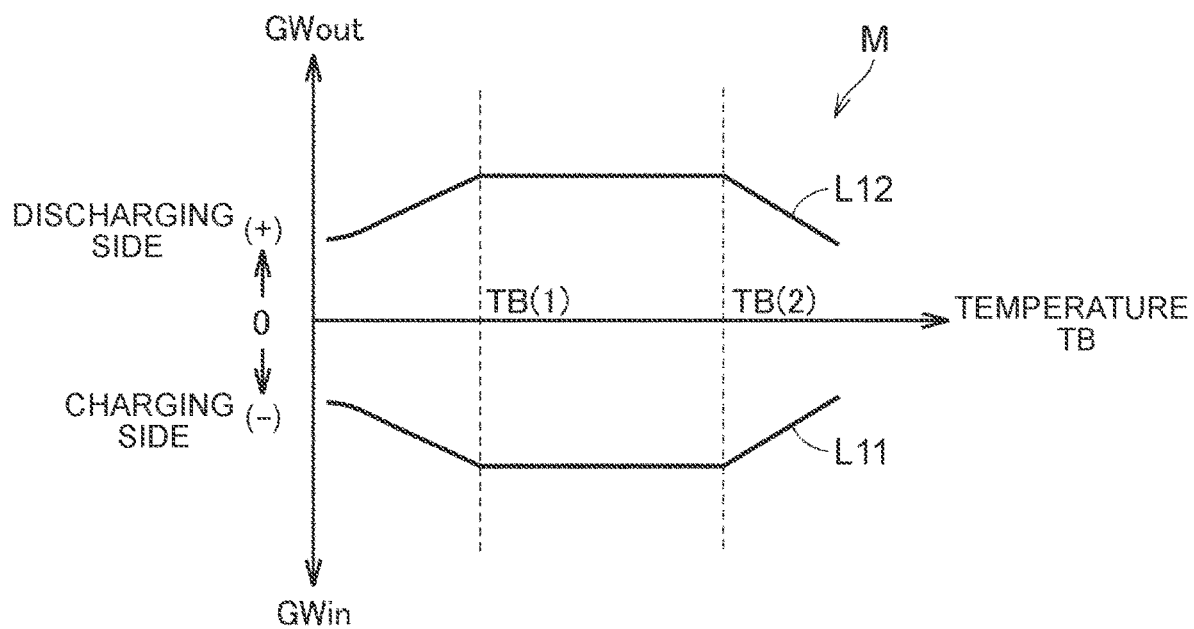
FIG. 5 shows an example of a map showing a predetermined relationship between the temperature of a battery 11 and a guard value.

FIG. 5 shows an example of a map showing a predetermined relationship between the temperature TB of the battery 11 and the guard values GWin and GWout. The vertical axis in FIG. 5 indicates the guard values GWin and GWout. The horizontal axis in FIG. 5 indicates the temperature TB of the battery 11. A line L11 in FIG. 5 indicates the relationship between the temperature TB and the guard value GWin. A line L12 in FIG. 5 indicates the relationship between the temperature TB and the guard value GWout. The map shown in FIG. 5 is stored in advance in the storage device 60c (FIG. 2).

As indicated by the line L11 in FIG. 5, the temperature TB and the guard value GWin have the following relationship. The guard value GWin is constant at a predetermined value when the temperature TB changes from TB (1) to TB (2). When the temperature TB is lower than TB (1), the magnitude of the guard value GWin becomes smaller as the temperature TB decreases. When the temperature TB is higher than TB (2), the magnitude of the guard value GWin becomes smaller as the temperature TB increases. The GWin calculation unit 61 calculates the guard value GWin in accordance with the temperature TB based on the line L11 in FIG. 5. Instead of the measured value of the temperature TB, for example, any one of average cell temperature, maximum cell temperature, and minimum cell temperature may be used as the temperature TB.

Returning to FIG. 4, the Win setting unit 62 is configured to use the guard value GWin input from the GWin calculation unit 61 and the provisional value PWin input from the battery ECU 13 to obtain the upper limit value Win of the input power. When the magnitude of the provisional value PWin is equal to or smaller than the magnitude of the guard value GWin, the Win setting unit 62 sets the provisional value PWin as the upper limit value Win of the input power. In contrast, when the magnitude of the provisional value PWin is larger than the magnitude of the guard value GWin, the Win setting unit 62 sets the guard value GWin as the upper limit value Win of the input power.

The GWout calculation unit 63 is configured to use the detection value of the battery sensor 12 separately from the battery ECU 13 to obtain the guard value GWout of the upper limit value of the output power. In the present embodiment, the GWout calculation unit 63 determines the guard value GWout using the temperature TB, for example. The GWout calculation unit 63 determines the guard value GWout using, for example, the temperature TB and a map or a mathematical expression, etc. showing a predetermined relationship between the temperature TB and the guard value GWout.

As indicated by the line L12 in FIG. 5, the temperature TB and the guard value GWout have the following relationship. The guard value GWout is constant at a predetermined value when the temperature TB changes from TB (1) to TB (2). When the temperature TB is lower than TB (1), the magnitude of the guard value GWout becomes smaller as the temperature TB decreases. When the temperature TB is higher than TB (2), the magnitude of the guard value GWout becomes smaller as the temperature TB increases. The GWout calculation unit 63 calculates the guard value GWout in accordance with the temperature TB based on the line L12 in FIG. 5.

Returning to FIG. 4, the Wout setting unit 64 is configured to use the guard value GWout input from the GWout calculation unit 63 and the provisional value PWout input from the battery ECU 13 to obtain the upper limit value Wout of the output power. When the magnitude of the provisional value PWout is equal to or smaller than the magnitude of the guard value GWout, the Wout setting unit 64 sets the provisional value PWout as the upper limit value Wout of the output power. In contrast, when the magnitude of the provisional value PWout is larger than the magnitude of the guard value GWout, the Wout setting unit 64 sets the guard value GWout as the upper limit value Wout of the output power.

Thus, when the provisional values PWin and PWout and the battery sensor signals are input from the battery pack 10 to the gateway ECU 60, the upper limit value Win of the input power is set by the GWin calculation unit 61 and the Win setting unit 62, and the upper limit value Wout of the output power is set by the GWout calculation unit 63 and the Wout setting unit 64. Then, the upper limit values Win and Wout and the battery sensor signals are output from the gateway ECU 60 to the HV ECU 50 as a command signal S2. As shown in FIG. 2, the gateway ECU 60 and the HV ECU 50 exchange information through CAN communication.

The HV ECU 50 includes a control unit 51 described below. In the HV ECU 50, for example, the control unit 51 is implemented by the processor 50a shown in FIG. 2 and the program executed by the processor 50a. However, the present disclosure is not limited to this, and the control unit 51 may be implemented by dedicated hardware (electronic circuit).

The control unit 51 is configured to use the upper limit value Win to control the input power of the battery 11. Further, the control unit 51 is configured to use the upper limit value Wout to control the output power of the battery 11. In the present embodiment, the control unit 51 creates a control command $S_{M1}$ for the MG 21a shown in FIG. 1, a control command $S_{M2}$ for the MG 21b shown in FIG. 1, and a control command SE for the engine 31 shown in FIG. 1 such that the input power of the battery 11 does not exceed the upper limit value Win and the output power of the battery 11 does not exceed the upper limit value Wout. The control unit 51 outputs a command signal S3 including the control command $S_{M1}$ for the MG 21a, the control command $S_{M2}$ for the MG 21b, and the control command SE for the engine 31 to the gateway ECU 60. The control commands $S_{M1}$ and $S_{M2}$ of the command signal S3 output from the HV ECU 50 are sent to the motor ECU 23 via the gateway ECU 60. The motor ECU 23 controls the PCU 24 (FIG. 1) in accordance with the received control commands $S_{M1}$ and $S_{M2}$. The control command SE of the command signal S3 output from the HV ECU 50 is sent to the engine ECU 33 via the gateway ECU 60. The engine ECU 33 controls the engine 31 in accordance with the received control command SE. By controlling the MG 21a, the MG 21b, and the engine 31 in accordance with the control commands $S_{M1}$, $S_{M2}$, and SE, respectively, the input power of the battery 11 is controlled so as not to exceed the upper limit value Win, and the output power of the battery 11 is controlled so as not to exceed the upper limit value Wout. The HV ECU 50 can adjust the input power and the output power of the battery 11 by controlling the engine 31 and the PCU 24.

As described above, the vehicle 100 according to the present embodiment includes the battery pack 10 including the battery ECU 13, and the HV ECU 50 and the gateway ECU 60 that are provided separately from the battery pack 10. The gateway ECU 60 is configured to relay communication between the battery ECU 13 and the HV ECU 50. The gateway ECU 60 is equipped with the GWin calculation unit 61, the Win setting unit 62, the GWout calculation unit 63, and the Wout setting unit 64. The Win setting unit 62 sets the upper limit value Win of the input power based on the comparison result of the guard value GWin obtained by the GWin calculation unit 61 and the provisional value PWin input from the battery pack 10. Therefore, for example, when the magnitude of the provisional value PWin is equal to or smaller than the magnitude of the guard value GWin, the Win setting unit 62 sets the provisional value PWin as the upper limit value Win, and when the magnitude of the provisional value PWin exceeds the magnitude of the guard value GWin (when the magnitude of the provisional value PWin is lower than the line L11 in FIG. 5), the Win setting unit 62 sets the guard value GWin as the upper limit value Win.

The Wout setting unit 64 sets the upper limit value Wout of the output power based on the comparison result of the guard value GWout obtained by the GWout calculation unit 63 and the provisional value PWout input from the battery pack 10. Therefore, for example, when the magnitude of the provisional value PWout is equal to or smaller than the magnitude of the guard value GWout, the Wout setting unit 64 sets the provisional value PWout as the upper limit value Wout, and when the magnitude of the provisional value PWout exceeds the magnitude of the guard value GWout (when the magnitude of the provisional value PWout is higher than the line L12 in FIG. 5), the Wout setting unit 64 sets the guard value GWout as the upper limit value Wout.

The HV ECU 50 is configured to use the upper limit value Win input from the gateway ECU 60 to control the input power of the battery 11. Further, the HV ECU 50 is configured to use the upper limit value Wout input from the gateway ECU 60 to control the output power of the battery 11. Therefore, the HV ECU 50 can appropriately perform the power-based input restriction and the power-based output restriction using the upper limit values Win and Wout, respectively.

In this way, in the battery ECU 13, when the magnitudes of the provisional values PWin and PWout of the power upper limit values become excessively large for some reason, the battery 11 can be protected by the guard values GWin and GWout. In other words, it is possible to monitor the suitability of the provisional values PWin and PWout of the power upper limit values calculated in the battery ECU 13 and restrain the input/output power of the battery 11 from becoming excessive. Thus, the present disclosure can provide a vehicle and a vehicle control system that monitor the suitability of the output result from the battery pack 10 and suppress the input/output power of the secondary battery from becoming excessive.

Further, by setting the guard values GWin and GWout in the gateway ECU 60, the input/output power of the battery 11 can be protected, and the communication between the battery ECU 13 and the HV ECU 50 is relayed by the gateway ECU 60 so that the battery ECU 13 and the HV ECU 50 can function in cooperation with each other to control the battery power of the secondary battery without changing the configurations of the battery ECU 13 and the HV ECU 50.

Further, the gateway ECU 60 sets the guard values GWin and GWout using the detection values of the battery sensor 12 that are used when the battery ECU 13 sets the provisional values PWin and PWout of the power upper limit values, and thus the suitability of the output result of the battery ECU 13 can be determined with high accuracy.

Further, the vehicle control system on which the battery pack 10 is mounted and that includes the HV ECU 50 and the gateway ECU 60 as described above can control the input/output power of the battery 11 with the vehicle control method including the first to third steps described below.

In the first step, the vehicle control system obtains the provisional values PWin and PWout of the upper limit values of the battery power of the battery 11 from the battery pack 10. In the second step, the vehicle control system uses the temperature TB of the battery 11 to set the guard values GWin and GWout of the upper limit values of the battery power. In the third step, the vehicle control system sets the power upper limit values Win and Wout so that the power upper limit value Win does not exceed the guard value GWin and the power upper limit value Wout does not exceed the guard value GWout.

With the first to third steps, a vehicle control method that enables monitoring of the suitability of the output result from the battery pack 10 and suppresses input/output power of the secondary battery from becoming excessive can be provided.

Hereinafter, modified examples will be described. In the above-described embodiment, the gateway ECU 60 uses the temperature TB of the battery 11 to set the guard values GWin and GWout of the upper limit values of the battery power. Alternatively, the SOC of the battery 11 may be used in addition to the temperature TB of the battery 11 to set the guard values GWin and GWout of the upper limit values of the battery power when the upper limit values of the battery power of the battery 11 are dependent on the SOC of the battery 11 in addition to the temperature TB of the battery 11.

Furthermore, in the above-described embodiment, the case where the battery ECU 13, the motor ECU 23, and the engine ECU 33 are connected to the local bus B1 has been described as an example, but the motor ECU 23 and the engine ECU 33 may be connected to the global bus B2.

Furthermore, in the above-described embodiment, the configuration of the hybrid vehicle as shown in FIG. 1 has been described as an example of the configuration of the electrically driven vehicle, but the configuration is not particularly limited to the hybrid vehicle. The electrically driven vehicle may be, for example, an electric vehicle that is not equipped with an engine, or a plug-in hybrid vehicle (PHV) configured to be able to charge a secondary battery in a battery pack using electric power supplied from outside the vehicle.

Furthermore, in the above-described embodiment, the configuration in which the HV ECU 50 controls the SMR 14 via the battery ECU 13 has been described as an example, but the HV ECU 50 may be configured to directly control the SMR 14 without using the battery ECU 13.

Furthermore, in the above-described embodiment, the case where the battery 11 (secondary battery) included in battery pack 10 is an assembled battery has been described as an example, but the battery 11 may be, for example, a single battery.

Furthermore, in the above-described embodiment, the configuration of the vehicle control system in which the HV ECU 50 and the gateway ECU 60 are provided as separate ECUs has been described as an example. Alternatively, for example, the vehicle control system may include an ECU in which the HV ECU 50 and the gateway ECU 60 are integrated into one ECU.

Figure 6:
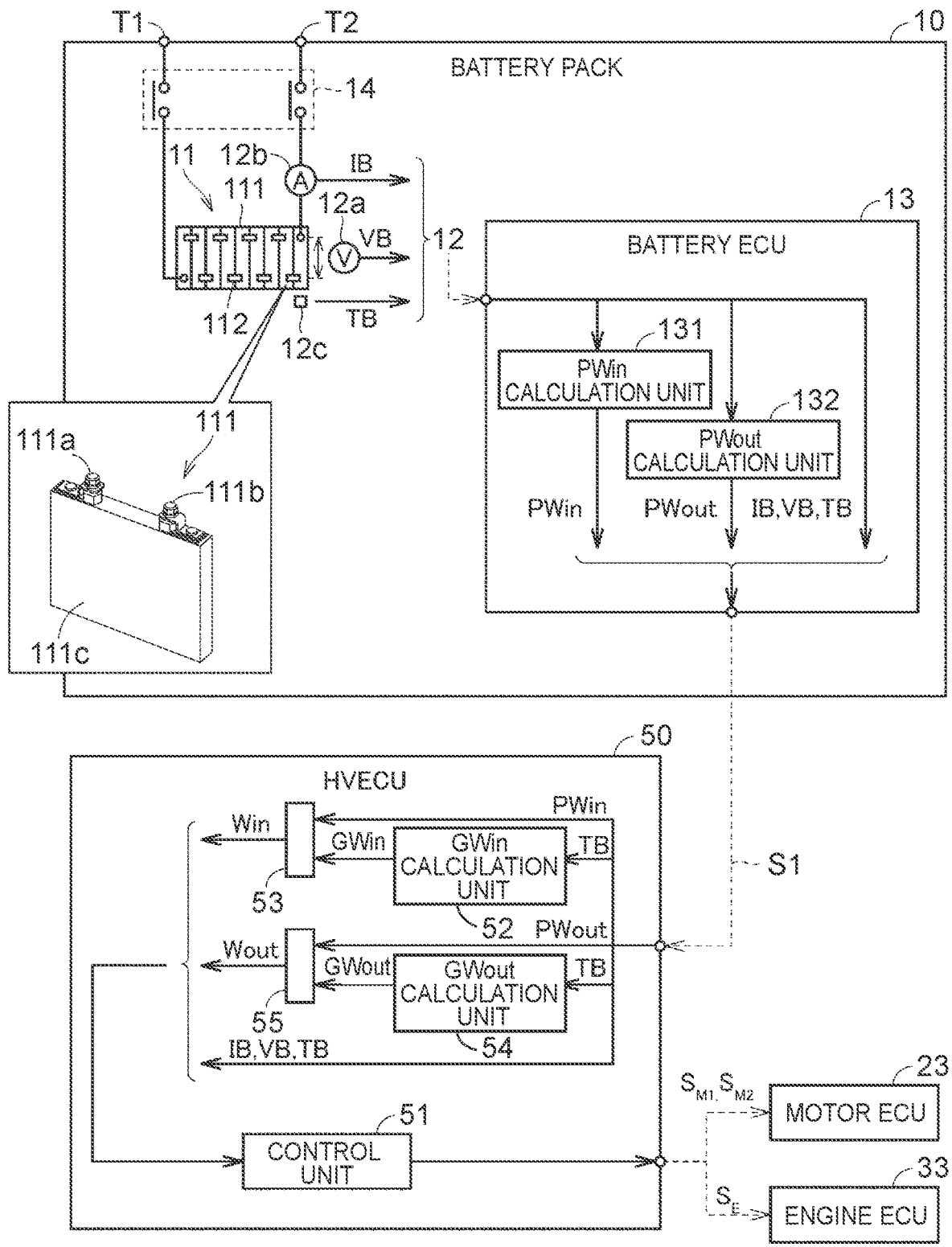
FIG. 6 is a diagram showing a detailed configuration of a battery pack 10 and an HV ECU 50 in a modified example.

FIG. 6 is a diagram showing a detailed configuration of the battery pack 10 and the HV ECU 50 in a modified example. In this modified example, the vehicle control system has a configuration in which the function of the gateway ECU 60 shown in FIG. 4 is incorporated in the HV ECU 50, and the HV ECU 50 corresponds to an example of the "second control device".

The battery pack 10 shown in FIG. 6 has the same configuration as the battery pack 10 shown in FIG. 4. Thus, detailed description of the configuration of the battery pack 10 will not be repeated.

The configuration of the HV ECU 50 shown in FIG. 6 is different from the configuration of the HV ECU 50 shown in FIG. 4 in that the HV ECU 50 shown in FIG. 6 includes a GWin calculation unit 52, a Win setting unit 53, a GWout calculation unit 54, and a Wout setting unit 55. The GWin calculation unit 52, the Win setting unit 53, the GWout calculation unit 54, and the Wout setting unit 55 respectively correspond to the GWin calculation unit 61, the Win setting unit 62, the GWout calculation unit 63, and the Wout setting unit 64 included in the gateway ECU 60 shown in FIG. 4. Thus, detailed description of the configuration of the GWin calculation unit 52, the Win setting unit 53, the GWout calculation unit 54, and the Wout setting unit 55 will be omitted.

By setting the guard values GWin and GWout in the HV ECU 50, the input/output power of the battery 11 can be protected, and the battery ECU 13 and the HV ECU 50 can function in cooperation with each other to control the battery power of the battery 11 without adding the gateway ECU 60.

Further, in the above-described embodiment, the gateway ECU 60 sets the guard values GWin and GWout using the detection values of the battery sensor 12 that are used when the battery ECU 13 sets the provisional values PWin and PWout of the power upper limit values. Alternatively, for example, the guard values GWin and GWout may be set using the detection value of a temperature sensor that is provided separately from the battery sensor 12 and that detects the temperature of the battery 11.

Figure 7:
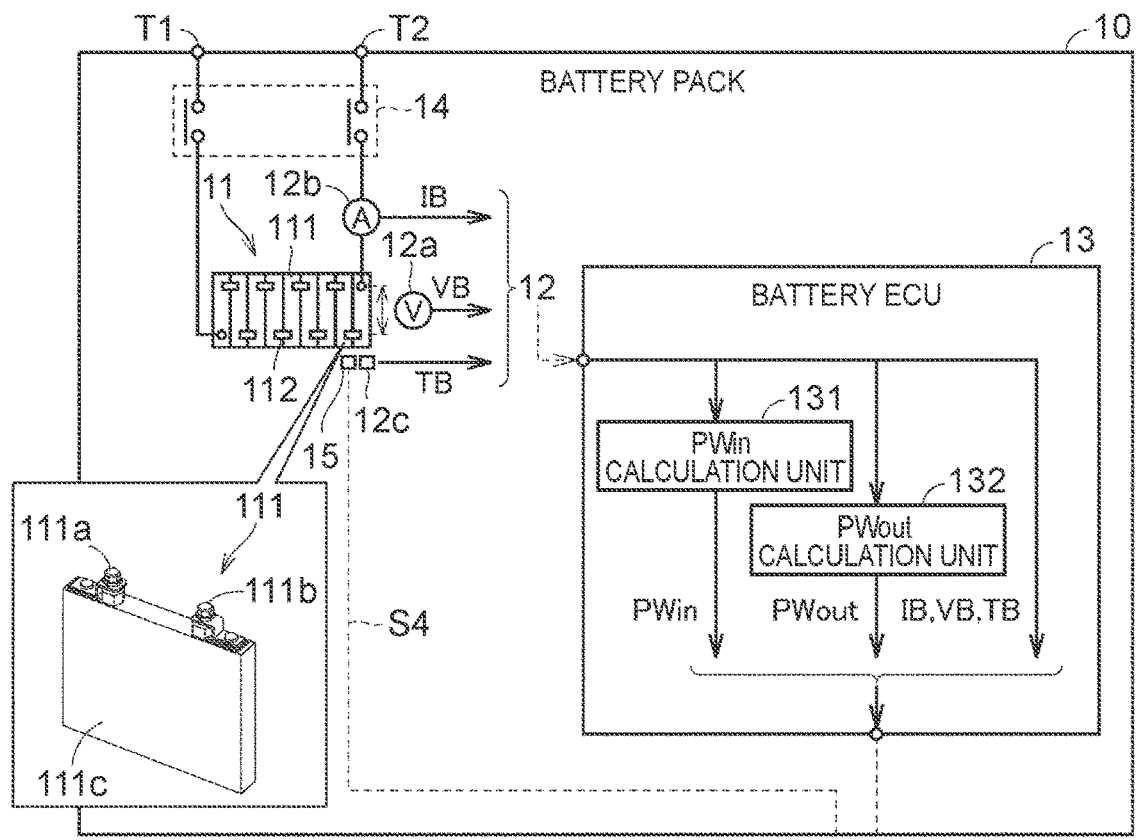
FIG. 7 is a diagram showing a detailed configuration of a battery pack, an HV ECU, and a gateway ECU in another modified example.
Figure 7:
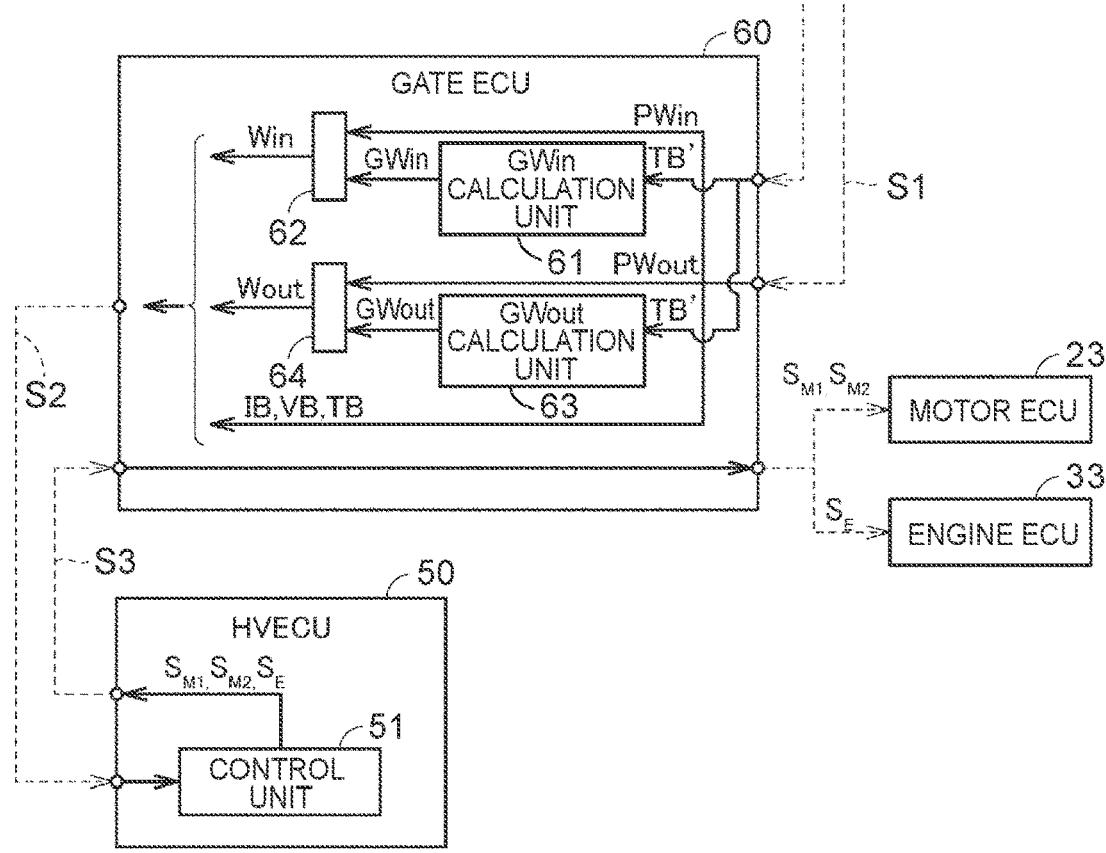

FIG. 7 is a diagram showing a detailed configuration of the battery pack 10, the HV ECU 50, and the gateway ECU 60 in another modified example.

The configuration of the battery pack 10 shown in FIG. 7 is different from the configuration of the battery pack 10 shown in FIG. 4 in that a temperature sensor 15 is provided in the battery 11 in addition to the temperature sensor 12c of the battery sensor 12. Other configurations of the battery pack 10 shown in FIG. 7 are the same as the configuration of the battery pack 10 shown in FIG. 4. Thus, detailed description of the battery pack 10 will not be repeated.

The temperature sensor 15 is provided in any one of the plurality of cells constituting the battery 11 and detects a temperature TB' of the battery 11. As with the temperature sensor 12c, the temperature sensor 15 may be provided, for example, for each of the cells constituting the battery 11, or one temperature sensor 15 may be provided for each set of multiple cells.

A signal indicating the temperature TB' detected by the temperature sensor 15 is output to the gateway ECU 60 as a command signal S4 that is different from the command signal from the battery ECU 13. The temperature TB' input to the gateway ECU 60 is input to each of the GWin calculation unit 61 and the GWout calculation unit 63. The GWin calculation unit 61 and the GWout calculation unit 63 use the temperature TB' and the map shown in FIG. 5 to calculate the guard values GWin and GWout, respectively.

In this way, the gateway ECU 60 sets the guard values GWin and GWout using the detection value of the temperature sensor 15 provided separately from the battery sensor 12, and thus the suitability of the output result of the battery ECU 13 can be determined with high accuracy even when a failure occurs in the battery sensor 12.

Furthermore, in the above-described embodiment, the temperature TB of the battery 11 is used to set the guard values GWin and GWout of the upper limit values of the battery power, but instead of setting the guard values of the upper limit values of the battery power, the guard values of allowable current during the charge/discharge may be set. The gateway ECU 60 sets the guard values of the allowable current during the charge/discharge, for example, by dividing the guard values GWin and GWout of the upper limit values of the battery power by the voltage VB of the battery 11. When the provisional values of the allowable current are input from the battery pack 10 and the magnitudes of the provisional values are larger than the magnitudes of the guard values, the gateway ECU 60 outputs the guard values to the HV ECU 50 as the allowable current. In contrast, when the magnitudes of the provisional values are smaller than the magnitudes of the guard values, the gateway ECU 60 outputs the provisional values to the HV ECU 50 as the allowable current. The HV ECU 50 controls the battery power of the battery 11 so that the battery current does not exceed the allowable current input from the gateway ECU 60.

Further, in the above-described embodiment, the upper limit values Win and Wout are set by the comparison result between the provisional values PWin and PWout of the upper limit values of the battery power and the guard values GWin and GWout, and the battery power is controlled so as not to exceed the set upper limit values Win and Wout. Alternatively, the SMR 14 may be controlled to the disconnected state, or in addition to or instead of controlling the SMR 14 to the disconnected state, a battery-less traveling may be performed in which the MG21b is driven using the electric power generated by the MG21a with the operation of the engine 31 and without using the electric power of the battery 11, when the state in which the magnitude of the provisional value PWin is larger than the magnitude of the guard value GWin continues until a predetermined time elapses or when the state in which the magnitude of the provisional value PWout is larger than the magnitude of the guard value GWout continues until a predetermined time elapses.

The above-described modified examples may be carried out by appropriately combining all or part thereof. The embodiments disclosed herein should be considered as illustrative and not restrictive in all respects. The scope of the present disclosure is shown by the claims, rather than the above embodiments, and is intended to include all modifications within the meaning and the scope equivalent to those of the claims.

A vehicle according to an aspect of the present disclosure includes: a battery pack including a secondary battery, a battery sensor configured to detect a state of the secondary battery, and a first control device; and a second control device provided separately from the battery pack. The first control device is configured to set a power upper limit value indicating an upper limit value of a battery power of the secondary battery by using a detection value of the battery sensor. The second control device is configured to set a guard value of the upper limit value of the battery power by using a temperature of the secondary battery and set the power upper limit value such that the power upper limit value does not exceed the guard value.

With this configuration, when the first control device sets the power upper limit value to an excessively large value for some reason, the input/output power of the secondary battery can be protected by the guard value that is set by the second control device.

In the above aspect of the present disclosure, the vehicle may further include a third control device provided separately from the battery pack and configured to control the battery power such that the battery power does not exceed the power upper limit value set by the second control device. The second control device may be configured to relay communication between the first control device and the third control device.

With this configuration, by setting the guard value in the second control device, the input/output power of the secondary battery can be protected, and communication between the first control device and the third control device is relayed so that the first control device and the third control device can function in cooperation with each other to control the battery power of the secondary battery without changing the configurations of the first control device and the third control device.

In the above aspect of the present disclosure, the second control device may be configured to control the battery power such that the battery power does not exceed the power upper limit value that has been set.

With this configuration, by setting the guard value in the second control device, the input/output power of the secondary battery can be protected, and the first control device and the second control device can function in cooperation with each other to control the battery power of the secondary battery.

In the above aspect of the present disclosure, the battery sensor may include a temperature sensor configured to detect the temperature of the secondary battery. The second control device may be configured to set the guard value by using a detection value of the temperature sensor.

With this configuration, the second control device sets the guard value by using the detection value of the battery sensor used when the first control device sets the power upper limit value, and thus the suitability of the output result of the first control device can be determined with high accuracy.

In the above aspect of the present disclosure, the vehicle may further include a temperature sensor provided separately from the battery sensor and configured to detect the temperature of the secondary battery. The second control device may be configured to set the guard value by using a detection value of the temperature sensor.

With this configuration, the second control device sets the guard value using the detection value of the temperature sensor provided separately from the battery sensor, and thus the suitability of the output result of the first control device can be determined with high accuracy even when a failure occurs in the battery sensor.

In the above aspect of the present disclosure, the power upper limit value set by the first control device may be a provisional power upper limit value which is set provisionally as the power upper limit value. The second control device may be configured to set the power upper limit value by comparing the provisional power upper limit value and the guard value.

In the above aspect of the present disclosure, the second control device may be configured to set the provisional power upper limit value as the power upper limit value when the provisional power upper limit value is equal to or smaller than the guard value, and set the guard value as the power upper limit value when the provisional power upper limit value is larger than the guard value.

A vehicle control system according to a second aspect of the present disclosure is configured such that a battery pack including a secondary battery is mountable on the vehicle control system. The vehicle control system includes: a control unit configured to control battery power of the secondary battery such that the battery power does not exceed a power upper limit value indicating an upper limit value of the battery power of the secondary battery when the battery pack is mounted on the vehicle control system; and a setting unit configured to, when the power upper limit value is input from the battery pack, set a guard value of the upper limit value of the battery power by using a temperature of the secondary battery, and set the power upper limit value such that the power upper limit value does not exceed the guard value.

A vehicle control method according to a third aspect of the present disclosure includes: obtaining, with a vehicle control system on which a battery pack including a secondary battery is mounted, a power upper limit value indicating an upper limit value of a battery power of the secondary battery from the battery pack; setting, with the vehicle control system, a guard value of the upper limit value of the battery power by using a temperature of the secondary battery; and setting, with the vehicle control system, the power upper limit value such that the power upper limit value does not exceed the guard value.

What is claimed is:

1. A vehicle comprising:
    a battery pack including a secondary battery, a battery sensor configured to detect a state of the secondary battery, and a first control device;
    a second control device provided separately from the battery pack, wherein:
        the first control device is configured to set a power upper limit value indicating an upper limit value of a battery power of the secondary battery by using a detection value of the battery sensor; and
        the second control device is configured to
            set a guard value of the upper limit value of the battery power by using a temperature of the secondary battery, and
            set the power upper limit value such that the power upper limit value does not exceed the guard value; and
    a third control device provided separately from the battery pack and configured to control the battery power such that the battery power does not exceed the power upper limit value set by the second control device, wherein:
        the second control device is configured to relay communication between the first control device and the third control device, and
        the second control device is different than and separate from the third control device.

2. The vehicle according to claim 1, wherein the second control device is configured to control the battery power such that the battery power does not exceed the power upper limit value that has been set.

3. The vehicle according to claim 1, wherein:
    the battery sensor includes a temperature sensor configured to detect the temperature of the secondary battery; and
    the second control device is configured to set the guard value by using a detection value of the temperature sensor.

4. The vehicle according to claim 1, further comprising a temperature sensor provided separately from the battery sensor and configured to detect the temperature of the secondary battery, wherein the second control device is configured to set the guard value by using a detection value of the temperature sensor.

5. The vehicle according to claim 1, wherein
    the power upper limit value set by the first control device is a provisional power upper limit value which is set provisionally as the power upper limit value, and
    the second control device is configured to set the power upper limit value by comparing the provisional power upper limit value and the guard value.

6. The vehicle according to claim 5, wherein the second control device is configured to
    set the provisional power upper limit value as the power upper limit value when the provisional power upper limit value is equal to or smaller than the guard value, and set the guard value as the power upper limit value when the provisional power upper limit value is larger than the guard value.

\* \* \* \* \*